US011537946B2

(12) United States Patent
Saito et al.

(10) Patent No.: US 11,537,946 B2
(45) Date of Patent: Dec. 27, 2022

(54) IDENTIFYING ENTITIES ABSENT FROM TRAINING DATA USING NEURAL NETWORKS

(71) Applicant: SAP SE, Walldorf (DE)

(72) Inventors: Sean Saito, Singapore (SG); Auguste Byiringiro, Singapore (SG)

(73) Assignee: SAP SE, Walldorf (DE)

( * ) Notice: Subject to any disclaimer, the term of this patent is extended or adjusted under 35 U.S.C. 154(b) by 400 days.

(21) Appl. No.: 16/813,948

(22) Filed: Mar. 10, 2020

(65) Prior Publication Data

US 2021/0287129 A1 Sep. 16, 2021

(51) Int. Cl.
*G06N 20/00* (2019.01)
*G06N 3/08* (2006.01)
*G06N 3/04* (2006.01)

(52) U.S. Cl.
CPC .......... *G06N 20/00* (2019.01); *G06N 3/0481* (2013.01); *G06N 3/08* (2013.01)

(58) Field of Classification Search
CPC ........ G06N 3/0481; G06N 20/00; G06N 3/08; G06N 3/0454
USPC .......................................... 706/6, 12, 15, 25
See application file for complete search history.

(56) References Cited

U.S. PATENT DOCUMENTS

2016/0189210 A1 6/2016 Lacey et al.
2017/0286805 A1* 10/2017 Yu .......................... G06V 20/63

OTHER PUBLICATIONS

Mukhoti Jishnu "The Intriguing Effects of Local Loss on the Caliberation of Deep Neural Networks" Dec. 24, 2019.*
U.S. Appl. No. 16/813,957, Saito et al., filed Mar. 10, 2020.
Fei-Fei et al., "One-shot learning of object categories." IEEE transactions on pattern analysis and machine intelligence, 28.4, Apr. 2006, 18 pages.
Guo et al., "On calibration of modern neural networks." Proceedings of the 34th International Conference on Machine Learning—vol. 70. JMLR. org, Aug. 6, 2017, 14 pages.
Janocha et al., "On loss functions for deep neural networks in classification." arXiv preprint arXiv:1702.05659, Feb. 18, 2017, 10 pages.
Lin et al., "Focal loss for dense object detection" Proceedings of tire IEEE international conference on computer vision, 2017, 10 pages.
Parikh et al., "A decomposable attention model for natural language inference." arXiv preprint arXiv:1606.01933, Jun. 6, 2016, 7 pages.
Extended European Search Report issued in European Application No. 20214072.9 dated Jun. 9, 2021, 10 pages.

(Continued)

*Primary Examiner* — Yosef K Laekemariam
(74) *Attorney, Agent, or Firm* — Fish & Richardson P.C.

(57) ABSTRACT

Methods, systems, and computer-readable storage media for a machine learning (ML) model and framework for training of the ML model to enable the ML model to correctly match entities even in instances where new entities are added after the ML model has been trained. More particularly, implementations of the present disclosure are directed to a ML model provided as a neural network that is trained to provide a scalar confidence score that indicates whether two entities in a pair of entities are considered a match, even if an entity in the set of entities was not accounted for in training of the ML model.

20 Claims, 5 Drawing Sheets

(56) References Cited

OTHER PUBLICATIONS

Johnson et al., "Deep learning and thresholding with class-imbalanced big data." 2019 18th IEEE International Conference On Machine Learning And Applications (ICMLA), Dec. 2019, 8 pages.

Mukhoti et al., "The Intriguing Effects of Focal Loss on the Calibration of Deep Neural Networks." 2019, 16 pages.

Liu et al., "Broken corn detection based on an adjusted YOLO with focal loss." IEEE Access 7, May 2019, 68281-68289, 9 pages.

Non-Final Office Action issued in U.S. Appl. No. 16/813,957 dated Jun. 22, 2022, 13 pages.

Tran et al., "Improving accuracy of lung nodule classification using deep learning with focal loss." Journal of healthcare engineering, Feb. 2019, 10 pages.

Yun et al., "Focal loss in 3d object detection." IEEE Robotics and Automation Letters 4.2, Jan. 2019, 1263-1270, 8 pages.

\* cited by examiner

IDENTIFYING ENTITIES ABSENT FROM TRAINING DATA USING NEURAL NETWORKS

BACKGROUND

In general, machine learning includes training a machine learning (ML) model that receives input and provides some output. Machine learning can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

In tasks commonly performed by ML models, the goal of the ML model is to learn some target function that maps data to a finite set of labels. For example, given an image, an image classification ML model categorizes content depicted in an image to a label in a set of labels (e.g., 10 labels including dog, cat, frog, deer, horse, plane, car, ship, truck, train). This is commonly referred to as a classification problem and is part of a supervised learning paradigm.

A drawback of the supervised learning paradigm is the assumption that the set of labels is immutable (i.e., that it does not change after the ML model has been trained). That is, if a ML model is trained on 10 classes (i.e., 10 labels, each label representing a respective class) using supervised training, the ML model can only categorize a sample among one of those classes. For example, if an image depicting content not included in the training data is input to the ML model, the ML model is unable to label the content. Consequently, this type of ML model and supervised learning paradigm are not practical for tasks, in which the set of labels changes after the ML model has been trained.

SUMMARY

Implementations of the present disclosure are directed to a machine learning (ML) model and framework for training of the ML model to enable the ML model to correctly match entities even in instances where new entities are added after the ML model has been trained. More particularly, implementations of the present disclosure are directed to a ML model provided as a neural network that is trained to provide a scalar confidence score that indicates whether two entities in a pair of entities are considered a match, even if an entity in the set of entities was not accounted for in training of the ML model.

In some implementations, actions include training a ML model using training data including a first set of entities and a second set of entities, defining an entity pair including a first entity and a second entity, the first entity being associated with first data representing the first entity and the second entity being associated with second data representing the second entity, the second entity being absent from the training data used to train the ML model using one-shot learning, providing a first entity string including at least a portion of the first data and a second entity string comprising at least a portion of the second data, processing the first entity string and the second entity string through a ML model to generate a scalar confidence score by: providing, by an embedding layer of the ML model, a first embedding based on the first entity string and a second embedding based on the second entity string, generating, by a decomposable attention layer of the ML model, a vector based on the first embedding and the second embedding, and generating, by an activation layer of the ML model, the scalar confidence score, the scalar confidence score representing a likelihood that the first entity matches the second entity, and determining that the first entity matches the second entity based on the scalar confidence score. Other implementations of this aspect include corresponding systems, apparatus, and computer programs, configured to perform the actions of the methods, encoded on computer storage devices.

These and other implementations can each optionally include one or more of the following features: the second entity string includes a concatenation of a first value of a first field and a second value of a second field of a table that stores the second data, each of the first value and the second value including a respective portion of the second data; the second entity string further includes at least one padding character between the first value and the second value; the ML model is trained using a binary cross-entropy loss function; the activation layer includes a sigmoid activation function; actions further include generating a set of negative training data, wherein training of the ML model is performed at least partially based on the set of negative training data; and the first entity includes a bank statement and the second entity includes a customer account.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to a machine learning (ML) model and framework for training of the ML model to enable the ML model to correctly match entities even in instances where new entities are added after the ML model has been trained. More particularly, implementations of the present disclosure are directed to a ML model provided as a neural network that is trained to provide a scalar confidence score that indicates whether two entities in a pair of entities are considered a match, even if an entity in the set of entities was not accounted for in training of the ML model.

Implementations can include actions of training a ML model using training data including a first set of entities and a second set of entities, defining an entity pair including a first entity and a second entity, the first entity being associated with first data representing the first entity and the second entity being associated with second data representing the second entity, the second entity being absent from the training data used to train the ML model using one-shot learning, providing a first entity string including at least a portion of the first data and a second entity string comprising at least a portion of the second data, processing the first entity string and the second entity string through a ML model to generate a scalar confidence score by: providing, by an embedding layer of the ML model, a first embedding based on the first entity string and a second embedding based on the second entity string, generating, by a decomposable attention layer of the ML model, a vector based on the first embedding and the second embedding, and generating, by an activation layer of the ML model, the scalar confidence score, the scalar confidence score representing a likelihood that the first entity matches the second entity, and determining that the first entity matches the second entity based on the scalar confidence score.

Implementations of the present disclosure are described in further detail with reference to an example problem space that includes the domain of finance and matching bank statements to customer accounts. More particularly, implementations of the present disclosure are described with reference to the problem of, given a bank statement (e.g., a computer-readable electronic document recording data representative of the bank statement), enabling an autonomous system to determine one or more customer accounts that are represented in the bank statement using a ML model. It is contemplated, however, that implementations of the present disclosure can be realized in any appropriate problem space.

To provide further context for implementations of the present disclosure, and as introduced above, ML models can be used in a variety of problem spaces. An example problem space includes autonomous systems tasked with matching items of one entity to items of another entity. Examples include, without limitation, matching questions to answers, people to products, bank statements to invoices, and bank statements to customer accounts.

Numerous ML problems deal with learning patterns and insights from data. Typically, the goal of a ML model is to enable autonomous systems to execute tasks and improve efficiencies of processes. For example, and in the example domain of finance, autonomous systems can be used to match a bank statement to a set of invoices that are present in the financial system and reconcile automatically. Another use case is to identify an entity (e.g., a customer) that another entity (e.g., a particular bank statement) belongs to. This information is not provided by default. In the example domain of finance, this information can be required to identify customers that potentially belong to a particular bank statement. The problem statement for this use case can be described as: given an entity (e.g., bank statement), find the set of entities (e.g., customers) that it belongs to. In these use cases, the term bank statement refers to a financial transaction (e.g., a payment (a check, a wire transfer) received for an invoice).

In ML, this is considered a multi-label classification problem, where a datum can belong to multiple categories. In the example use case, this is possible because a payment from some customer can be used to pay for its own invoice or an invoice of its subsidiary (which is a different account, categorically speaking). Like ordinary classification problems, multi-label classification problems can be solved by training a ML model in a supervised training process that uses annotated training data with a fixed set of labels (e.g., a database of customers, where each label represents a respective customer). However, after the ML model has been trained, new customers can be added to the database, which are not represented in the training data that had been used to train the ML model. This breaks the supervised learning paradigm, because the ML model assumes that the set of customers it must match a bank statement to is fixed at training time. Consequently, it is not possible for the ML model to match a bank statement to a newfound customer. Instead, with each addition of a customer, the ML model would need to be retrained with a dataset that includes the new customer. This is inefficient in terms of time and technical resources required to continuously retrain ML models, test the ML models, and deploy the ML models to the autonomous systems.

In view of the above context, implementations of the present disclosure provide an autonomous system that overcomes disadvantages of traditional systems, such as those described herein. More particularly, implementations of the present disclosure formulate the use case as a matching problem rather than a classification problem. Further, implementations of the present disclosure provide a ML model as a neural network that outputs a similarity score rather than a confidence distribution. Implementations of the present disclosure also use a training pipeline that trains the ML model to learn between "positive" and "negative" matches of entities (e.g., bank statements and customers). As described in further detail herein, implementations of the present disclosure enable new entities (e.g., customers) to be freely added to a database after training of the ML model without having to re-train the ML model. In accordance with implementations of the present disclosure, during production use, the autonomous system is still able to accurately identify entities that are not included in original training data using the ML model provided herein.

Figure 1:
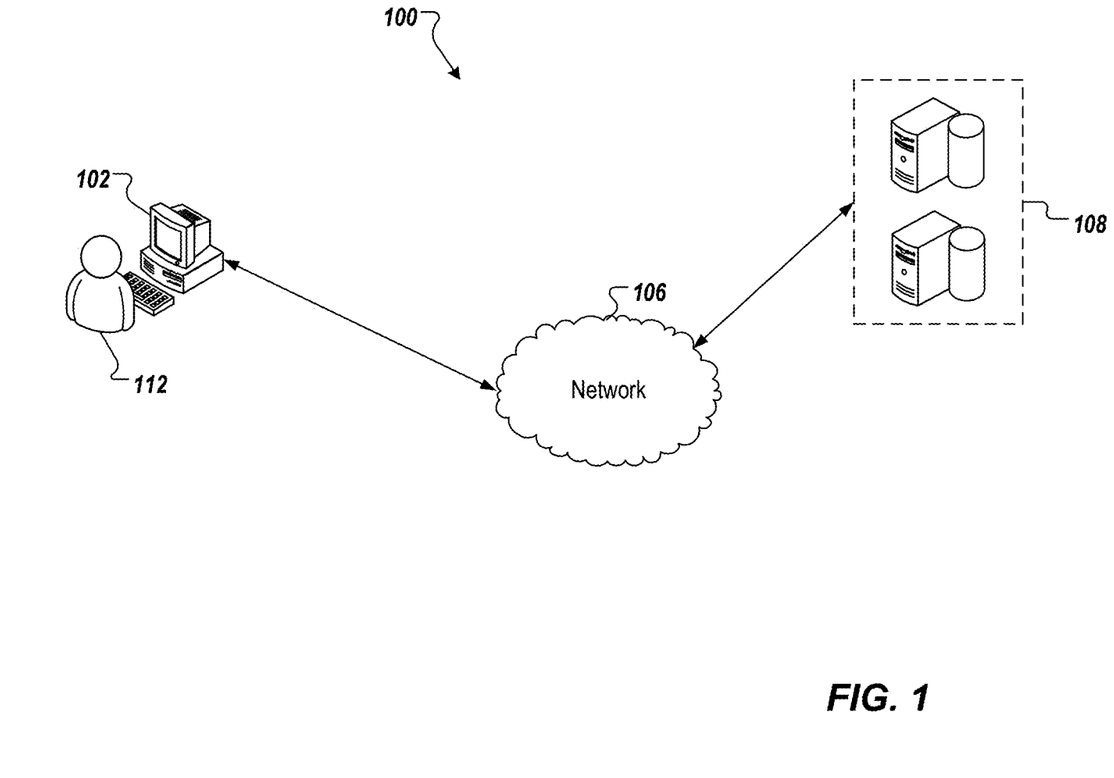
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host an autonomous system that uses a ML model to match entities. That is, the server system 104 can receive computer-readable electronic documents (e.g., bank statements), and can match electronic documents (e.g., a bank statement) to entities (e.g., customers represented in data stored in a customer database). In some examples, the server system 104 includes a ML platform that provides and trains a ML model, as described herein.

In accordance with implementations of the present disclosure, and in the example problem space, the autonomous system uses the ML model to match a bank statement to a customer. In particular, implementations of the present disclosure formulate the use case as a matching problem rather than a classification problem. Implementations of the present disclosure also provide a ML model as a neural network that outputs a similarity score rather than a confidence distribution. Further, implementations of the present disclosure use a training pipeline that trains the ML model to learn between "positive" and "negative" matches of entities (e.g., bank statements and customers).

In further detail, in common ML problems, the goal of the ML model is to learn some target function that maps data X (e.g., a set of bank statements) to a finite set of labels Y (e.g., each label representing a respective customer). For example, given an image, an image classification ML model would try to categorize content depicted in image among one of multiple labels (e.g., 10 labels including dog, cat, frog, deer, horse, plane, car, ship, truck, train). This is commonly referred to as a classification problem and is part of the supervised learning paradigm. As introduced above, a drawback of the supervised learning paradigm is the assumption that the set of labels Y is immutable. That is, if a ML model is trained on 10 classes (i.e., 10 labels, each label representing a respective class) using supervised training, the ML model can only categorize a sample among one of those classes after being trained. For example, if an image depicting a tiger is input to the above-mentioned image classification ML model, it will not be able to recognize it as such. This assumption does not hold for the example use case of identifying customer accounts for a given bank statement, because new customers are frequently added to the system after the ML model has been trained. A multi-label classification ML model that is trained using supervised training would not be able to identify bank statements coming from the new customers.

To mitigate this, implementations of the present disclosure formulate the task as a matching problem. Instead of categorizing the bank statement among one of N historical customer accounts collected at training time, implementations of the present disclosure provide a framework, in which the ML model compares a given bank statement with each customer account provided during production use of the ML model (e.g., use of the ML model by an autonomous system, to which the ML model is deployed). Formulating the task as a matching problem removes the assumption of a finite set of labels that comes from historical training data.

Figure 2A:
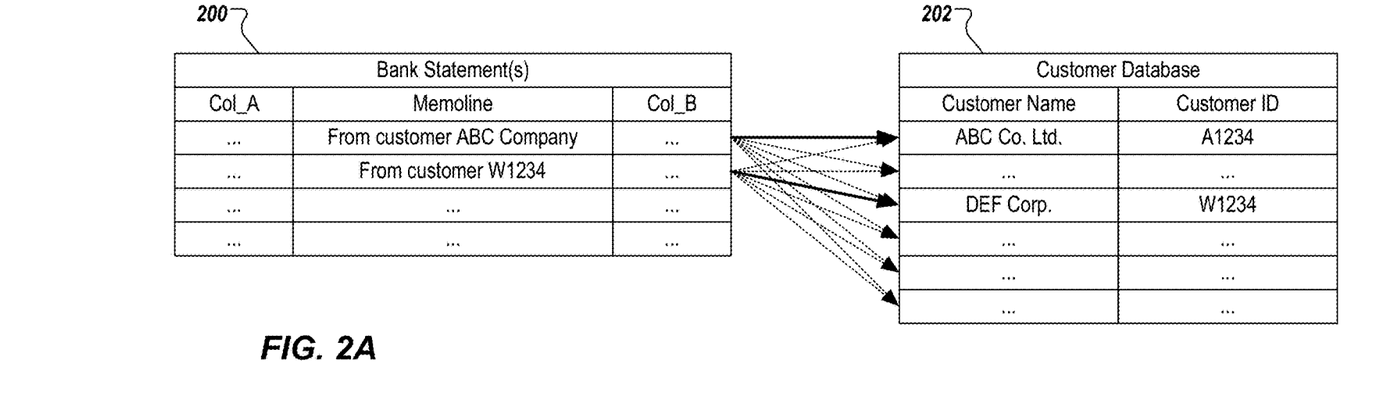
FIG. 2A depicts a graphical representation for identifying sets of entities as a matching problem in accordance with implementations of the present disclosure.

FIG. 2A depicts a graphical representation for identifying sets of entities as a matching problem in accordance with implementations of the present disclosure. In the example of FIG. 2A, bank statements 200 are to be matched to customers 202 by a ML model. In accordance with implementations of the present disclosure, each bank statement 200 is compared to each customer 202 as respective bank statement and customer (BS-C) pairs. The ML model of the present disclosure, which is trained in accordance with implementations of the present disclosure, provides a scalar confidence score for each BS-C pair. Each scalar confidence score represents a likelihood that the bank statement in the BS-C pair matches the customer. In the example of FIG. 2A, the solid arrows depict a BS-C pair determined to be a match by the ML model described herein. The dashed arrows depict BS-C pairs determined not to be matches by the ML model described herein.

Implementations of the present disclosure provide a framework for training of the ML model, which framework can be referred to as one-shot learning. One-shot learning can be described as an object categorization problem that enables a ML model to learn information about object categories from a single, or only a few, training samples. In the example use case of the present disclosure, one-shot learning is used to train the ML model of the present disclosure to learn information about customers from a single, or only a few, training samples of historical BS-C pairs (both positive and negative samples). One-shot learning is effective in situations where data for a particular class is scarce and new labels can be introduced after training of the ML model. As described in further detail herein, implementations of the present disclosure also provide a ML model as a neural network that learns to match bank statements to customers under this one-shot learning framework.

A characteristic difference between a neural network trained using supervised learning and a neural network trained using one-shot learning is the number of inputs and outputs. Whereas the former takes in a single bank statement and outputs a vector of confidence scores using a softmax regression (e.g., a generalization of logistic regression that can be used for multi-class classification where classes are mutually exclusive), the latter takes in two inputs and provides a single scalar output from a sigmoid activation function (e.g., a mathematical function having a S-shaped curve). More formally, a neural network trained using supervised learning maps an input to a set of labels, as represented by the following relationship:

$$f: X \to Y$$

where f is a mapping function learned during supervised training, X is a set of inputs, and Y is a set of labels.

In contrast, a neural network trained using one-shot learning takes a set of inputs (e.g., BS-C pairs) and maps each pair to scalar confidence score. This is represented by the following example relationship:

$$g: X \times M \to p$$

where, in the example use case of the present disclosure, X is the set of bank statements (e.g., $X=[x_1, \ldots, x_q]$; q is the number of bank statements in X), M is the set of candidate customer accounts (e.g., $M=[m_1, \ldots, m_r]$; r is the number of customer accounts in M), and p is the scalar confidence score (e.g., between 0 and 1) indicating how likely a bank statement $x \in X$ matches a customer account $m \in M$ in a BS-C pair (e.g., [x, m]).

In accordance with implementations of the present disclosure, each bank statement and each customer account is represented as a respective string. More particularly, bank statements and customer accounts are originally represented in tabular form in respective tables (e.g., as depicted in FIG. 2A). Each bank statement is represented in a row of a bank statement table and each customer account is represented in a row of a customer table. In some examples, for customers, customer data provided in a row is concatenated to provide a customer string. For example, customer data can include a customer name and a customer identifier (ID) (e.g., an identifier uniquely identifying a respective customer within a financial system). In some examples, for bank statements, free-text fields that contain customer information are concatenated to provide a bank statement string. An example field includes the memoline. In some examples, a single field is used for the bank statement string (i.e., there is not concatenation of text across multiple fields). For example, just the text provided in the memoline is used as the bank statement string.

In some implementations, each string is of a fixed length, where length is determined as a number of characters. In some examples, a space is also counted as a character (e.g., the string [Mr. Jones] has a length of 9 (characters)). In some examples, the length of the string can be determined based on a maximum length present within a dataset. For example, for bank statements, memolines of all bank statements in the set of bank statements can be scanned to determine the longest length across all bank statements. As another example, for customer accounts, each field that is to be concatenated is handled individually. For example, for customer name, the names of all customers in the set of customer accounts can be scanned to determine the longest length across all customer names, and, for customer ID, the customer IDs of all customers in the set of customer accounts can be scanned to determine the longest length across all customer ID.

In some examples, the maximum length of a respective field is set as the longest length determined for that field. For example, if the longest length of memolines is 90 characters, the maximum length for the memolines is determined to be 90 characters. As another example, if the longest length of customer names is determined to be 12 characters, the maximum length for the customer names is determined to be 12 characters. As still another example, if the longest length of customer IDs is determined to be 5 characters, the maximum length for customer IDs is determined to be 5 characters.

In some examples, the maximum length of a respective field is determined to be the longest length plus a number of additional characters. In some examples, the number of additional characters is specific to respective fields (e.g., 10 additional characters for memolines, 4 additional characters for customer names, 3 additional characters for customer IDs). For example, if the longest length of memolines is 90 characters, the maximum length for the memolines is determined to be 100 characters. As another example, if the longest length of customer names is determined to be 12 characters, the maximum length for the customer names is determined to be 16 characters. As still another example, if the longest length of customer IDs is determined to be 5 characters, the maximum length for customer IDs is determined to be 8 characters.

In some implementations, in determining the strings, a padding character is used to lengthen strings that are shorter than the maximum length to achieve the maximum length. An example padding character can include, without limitation, the hash character (#). It is contemplated, however, that any appropriate character can be used as a padding character. As one non-limiting example, if the maximum length for the memoline is determined to be 100 characters and an example memoline includes 80 characters, 20 padding characters are added to the end of the memoline to provide the bank statement string for the respective bank statement.

Using the example customer names depicted in FIG. 2A as non-limiting examples, and using an example maximum length of 16 characters, the following example sub-strings can be provided:

ABC Co. Ltd. ####
DEF Corp. #######

Using the example customer IDs depicted in FIG. 2A as non-limiting examples, and using an example maximum length of 8 characters, the following example sub-strings can be provided:

A1234 ###
W1234 ###

Figure 2B:
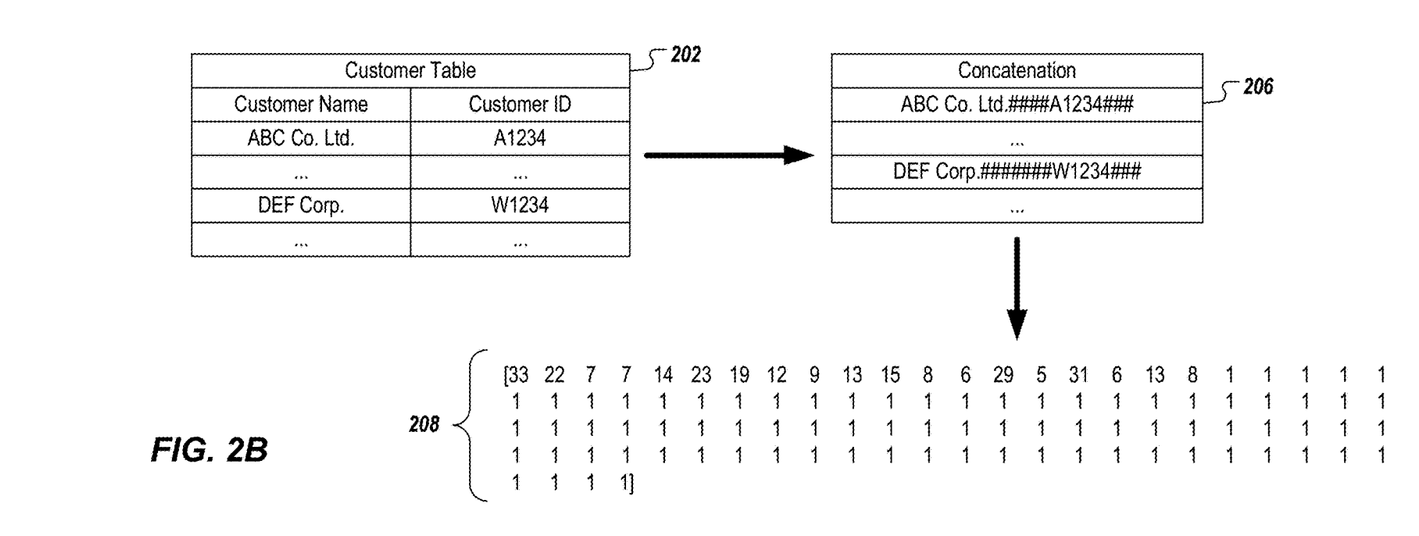
FIG. 2B depicts a graphical representation for an input representation flow in accordance with implementations of the present disclosure.

As introduced above, in some implementations, a string is provided as a concatenation of two or more fields. For example, a customer string is provided as a concatenation of the value (plus additional characters, if any) of the customer name and the value (plus additional characters, if any) of the customer ID. For example, FIG. 2B depicts a graphical representation for an input representation flow in accordance with implementations of the present disclosure. The example of FIG. 2B depicts an example provision of customer strings 206 based on concatenation of example customer data. In the example of FIG. 2B, the following example customer strings are provided:

ABC Co. Ltd. ####A1234 ###
DEF Corp. #######W1234 ###

In accordance with implementations of the present disclosure, the neural network converts each of the bank statement string and the customer string into a respective embedding. An embedding can be described as an array of vectors that provides an abstract representation of the underlying string (e.g., bank statement string, customer string). In some examples, the neural network of the present disclosure includes an embedding layer that converts each string to a respective embedding. In some examples, embeddings can be provided by splitting a string into individual characters, mapping each character to a vector representative of the respective character, and concatenating the vectors to provide a two-dimensional matrix which represents the respective string.

FIG. 2B depicts an example vector 208 (also referred to herein as embedding) for a customer string provided from the example customer data.

In accordance with implementations of the present disclosure, for each BS-C pair, the respective bank statement embedding and the respective customer embedding are compared by the neural network. In some examples, the neural network applies decomposable attention to compare the embedding (vector) inputs. For example, the neural network processes the bank statement embedding and the customer embedding using decomposable attention to determine a degree of match for the respective pair (i.e., bank statement and customer pair).

In some examples, decomposable attention compares two strings to determine which portions of each string match. The inputs to decomposable attention are two strings (string_1 and string_2) represented as respective embeddings (two-dimensional matrices). In some examples, decomposable attention includes multiple phases: attend, compare, and aggregate.

In the attend phase, dot products between each feature in string_1 and each feature in string_2 are calculated, which is preceded by some non-linear activation. These generate attention weights for a pair of tokens from string_1 and string_2. These are further normalized by taking the sum of all attention weights from one token from string_1 and all tokens from string_2 (and vice-versa). This results in a normalized attention vector that represents an "importance score" for a pair of tokens from string_1 and string_2. In the compare phase, each token from string_1 is concatenated with its attention vector and a non-linear activation is applied. This is also performed for string_2. Doing this for each token generates a matrix for string_1 and string_2, respectively. In the aggregate phase, each matrix is aggregated into a single vector by an aggregation function (e.g., sum, mean). The vectors for string_1 and string_2 are concatenated to form a single vector output.

Mathematically, each phase can be described, respectively, as follows:

Attend Phase:

$$e_{ij} = F'(a_i, b_j) = F(a_i)^T F(b_j)$$

$$\beta_i = \sum \frac{\exp(e_{ij})}{\sum_{k=1} \exp(e_{ik})} b_j$$

$$\alpha_j = \sum \frac{\exp(e_{ij})}{\sum_{k=1} \exp(e_{kj})} a_i$$

Compare Phase:

$$v_{1,i} = F([\alpha_i, \beta_i])$$

$$v_{2,j} = F([b_j, \alpha_j])$$

Aggregate Phase:

$$v_1 = \Sigma_{i=1} v_{1,i}$$

$$v_2 = \Sigma_{j=1} v_{2,i}$$

$$v = [v_1, v_2]$$

Intuitively, using decomposable attention, the neural network uses the respective embeddings to determine which parts of the bank statement string match with the customer string. The output of decomposable attention is a single vector that contains the results of these comparisons. In some examples, the single vector can be described as a consolidated result of comparing each token in string_1 to those of string_2 and vice-versa.

In accordance with implementations of the present disclosure, the neural network further includes a fully-connected layer (also referred to herein as an activation layer) that processes the single vector output of the decomposable attention layer to provide the scalar confidence score (p). In some examples, the fully-connected layer includes a sigmoid activation function, the output of which is the scalar confidence score (p). More particularly, the sigmoid activation function converts the single vector to a value within a range (e.g., 0 to 1) and outputs the value as the scalar confidence score (p).

In some examples, the sigmoid function is defined as follows:

$$\sigma(z) = \frac{1}{1 + e^{-z}}$$

This relationship projects the input to a value between [0, 1] (e.g., confidence score). Z is the penultimate layer before the sigmoid activation. Because the output is to be provided as a scalar, the vector input is converted to a scalar by applying a linear transformation. An example linear transformation can be provided as:

$$z(X) = X \cdot W + b$$

where W is a matrix with shape (d, 1), where d is the dimension of X, and b is a bias parameter. Given that X has a shape of (N, d) (where N is the batch size, and d the output dimension of decomposable attention), z has shape (N, 1). Accordingly, scalar sigmoid outputs for each sample can be provided.

As described herein, the scalar confidence score (p) indicates a probability of a match between the bank statement and the customer account represented in the respective BS-C pair. In some implementations, the scalar confidence score can be compared to a threshold score. If the scalar confidence score exceeds the threshold score, it is determined that the bank statement and the customer account of the respective BS-C pair match. If the scalar confidence score does not exceed the threshold score, it is determined that the bank statement and the customer account of the respective BS-C pair do not match.

In accordance with implementations of the present disclosure, in instances where the customer account is new and was not considered during training of the ML model, the ML model is able to generate a vector representation of the new customer account to compare to one or more bank statements. Intuitively, the ML model is looking at individual characters of the customer account within the customer account string (e.g., concatenation of columns of the customer data). As described herein, the ML model of the present disclosure is designed and trained to process an alphabet of individual characters, as opposed to individual words (tokens), and maps every character to a single vector. In this manner, the ML model of the present disclosure is able to process and potentially match customer accounts added after training of the ML model.

In accordance with implementations of the present disclosure, training of the ML model (neural network) accounts for learning between both positive matches and negative matches. More particularly, training data for one-shot learning looks different from that of supervised learning. For supervised learning, the training data is provided in pairs of data and labels (e.g., (x, y)∈X×Y). In contrast, and in the example use case, in one-shot learning, the neural network (ML model) is trained to predict whether a bank statement and a customer account within a pair match. To achieve this, the training data must have both positive pairs (i.e., pairs of bank statements and customer accounts that match) and negative pairs (i.e., pairs of bank statements and customer accounts that do not match). Training data for one-shot learning can be represented as follows:

$$(x,m,l) \in X \times M \times \{0,1\}$$

where x is a bank statement, m is a customer account, and l indicates whether the particular BS-C pair (e.g., [x, m]) is a match (e.g., l=1 indicates a match, l=0 indicates not a match).

In some examples, historical transactions indicate only positive matches across BS-C pairs (e.g., l=1 for all BS-C pairs in the historical data). Consequently, implementations of the present disclosure provide for generating negative matches that can be used to train the neural network using one-shot learning. In one approach, negative matches could be provided by sampling r-1 negative customers for each bank statement in the historical data. That is, in a set of customer accounts M, which includes r customer accounts m, a single customer account matches a respective bank statement x. Consequently, the remaining r-1 customer accounts can be considered negative matches to the respective bank statement x. However, this approach can make the overall dataset size overly large, which would result in inefficiencies in training of the neural network in terms of both time and computing resources expended.

In view of this, implementations of the present disclosure set a constant k for limiting the number of negative pairs generated from the historical data for each bank statement included in the historical data. In some implementations, for each bank statement, a set of negative customer accounts is provided and includes all customer accounts in the historical data except for the customer account that was matched to the bank statement. Accordingly, the set of negative customer accounts includes r-1 customer accounts, which are all of the negative samples with respect to the bank statement. In accordance with implementations of the present disclosure, customer accounts are selectively filtered from the set of negative customer accounts to provide a sub-set of negative customer accounts that include k or less than k customer accounts. For example, if r-1 is not greater than k, filtering can be foregone, and the set of negative customer accounts can be used. However, if r-1 is greater than k, filtering can be applied to define a sub-set of negative customer accounts.

In some implementations, filtering is applied such that the customer accounts remaining in the sub-set of negative customer accounts, while negative matches to the bank statement, have some similarity to the customer account that was the positive match to the bank statement. Accordingly, one or more features of the customer account that was the positive match to the bank statement can be determined, and the one or more features can be used to filter customer accounts from the set of negative customer accounts to provide the sub-set of negative customer accounts. Example features can include, without limitation, country, state, city, and company code.

In some examples, a feature can be selected and any customer accounts not including the same value for the feature are filtered from the set of negative customer accounts. Using country as a non-limiting example, it can be determined that the customer account that was a positive match for the bank statement has a country value equal to United States (e.g., the country, in which the customer associated with the customer account is located). In this non-limiting example, country accounts that do not include a country value equal to United States are filtered from the set of negative customer accounts to provide the sub-set of negative customer accounts.

In some examples, filtering can be iteratively performed until the number of customer accounts in the sub-set of negative customer accounts is less than or equal to k. For example, customer accounts in the set of negative customer accounts can be filtered based on a first feature (e.g., country) to provide a first sub-set of negative customer accounts. It can be determined that the number of customer accounts in the first sub-set of negative customer accounts is greater than k. In response, customer accounts in the first sub-set of negative customer accounts can be filtered based on a second feature (e.g., state) to provide a second sub-set of negative customer accounts. It can be determined that the number of customer accounts in the second sub-set of negative customer accounts is less than or equal to k. Consequently, the second sub-set of negative customer accounts can be used in training the ML model.

Implementations of the present disclosure further provide for a loss function that is used in training of the ML model. In general, ML models are iteratively trained, where, at each iteration, a loss value is determined based on a loss function. The loss value represents a degree of accuracy of the output of the ML model. In general, the loss value can be described as a representation of a degree of difference between the output of the ML model and an expected output of the ML model (the expected output being provided from the training data). In some examples, if the loss value does not meet an expected value (e.g., is not equal to zero), parameters of the ML model are adjusted, and another iteration of training is performed. In some instances, this process is repeated until the loss value meets the expected value.

A commonly used loss function includes categorical cross-entropy (CCE), which is used in supervised training of ML models having a softmax function that provides output of the ML model (e.g., the softmax function a vector of K real numbers as input and normalizes the vector into a probability distribution). In contrast, and as described herein, the ML model of the present disclosure outputs a scalar confidence score (p) that represents a likelihood of entities in a pair of entities being a match (e.g., a likelihood that a bank statement matches a customer). In view of this, implementations of the present disclosure use a binary cross-entropy function (BCE) to train the ML model. That is, the ML model of the present disclosure is trained to minimize binary cross-entropy, which focuses on single outputs (e.g., a scalar confidence score). An example relationship for a binary cross-entropy function is provided as:

$$BCE = \sum_{i=1}^{n} -(l_i \log q_i + (1 - l_i)\log(1 - q_i))$$

where l is the known label from the training data (e.g., l=0, l=1) and q is the output of the neural network (e.g., q=0, q=1).

Figure 3:
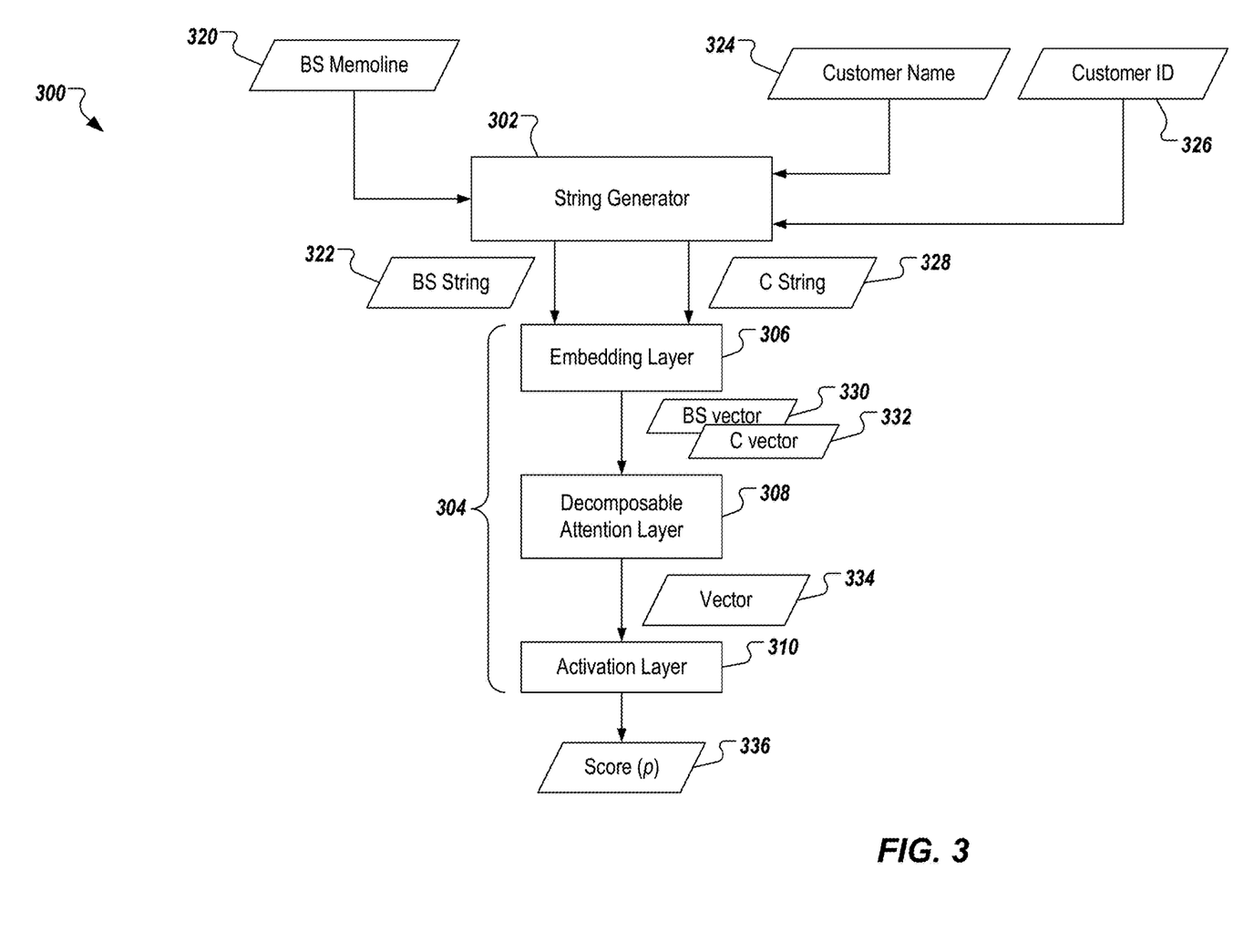
FIG. 3 depicts an example conceptual architecture in accordance with implementations of the present disclosure.

FIG. 3 depicts an example conceptual architecture 300 in accordance with implementations of the present disclosure. In the example of FIG. 3, the example conceptual architecture includes a string generator 302 and a ML model 304. In some examples, the string generator 302 and the ML model 304 can be executed as apart of an autonomous system. As described herein, the ML model 304 is provided as a neural network that includes an embedding layer 306, a decomposable attention layer 308, and an activation layer 310. Further, the ML model 304 is trained using one-shot learning based on positive samples and negative samples, as described herein.

In some implementations, for each bank statement, the string generator 302 receives bank statement data, such as a bank statement memoline 320 and generates a bank statement (BS) string 322, as described herein (e.g., memoline characters plus padding character(s)). In some implementations, for each customer account, the string generator 302 receives customer account data, such as a customer name 324 and a customer ID 326, and generates a customer (C) string 328, as described herein (e.g., concatenation of customer name characters plus padding character(s) and customer ID characters plus padding character(s)). The BS strings 322 for all bank statements that are to be considered and the C strings 328 for all customer accounts that are to be considered are provided for processing by the neural network 304. In some examples, BS string 322 and C string 328 pairs for respective BS-C pairs are incrementally provided to the neural network 304 for processing, as described herein.

In some implementations, for each BS string 322 and C string 328 pair the embedding layer 306 provides a BS string embedding as a BS vector 322 and a C string embedding as a C vector 324, as described herein. The decomposable attention layer 308 processes the BS vector 330 and the C vector 332 to provide the single vector 334, as described herein. The activation layer 310 processes the single vector 334 through a sigmoid activation function, as described herein, to provide a scalar confidence score (p) 336 for the respective BS-C pair. The scalar confidence score (p) is used as described herein to determine whether the bank statement and the customer account of the respective BS-C pair are a match.

Figure 4:
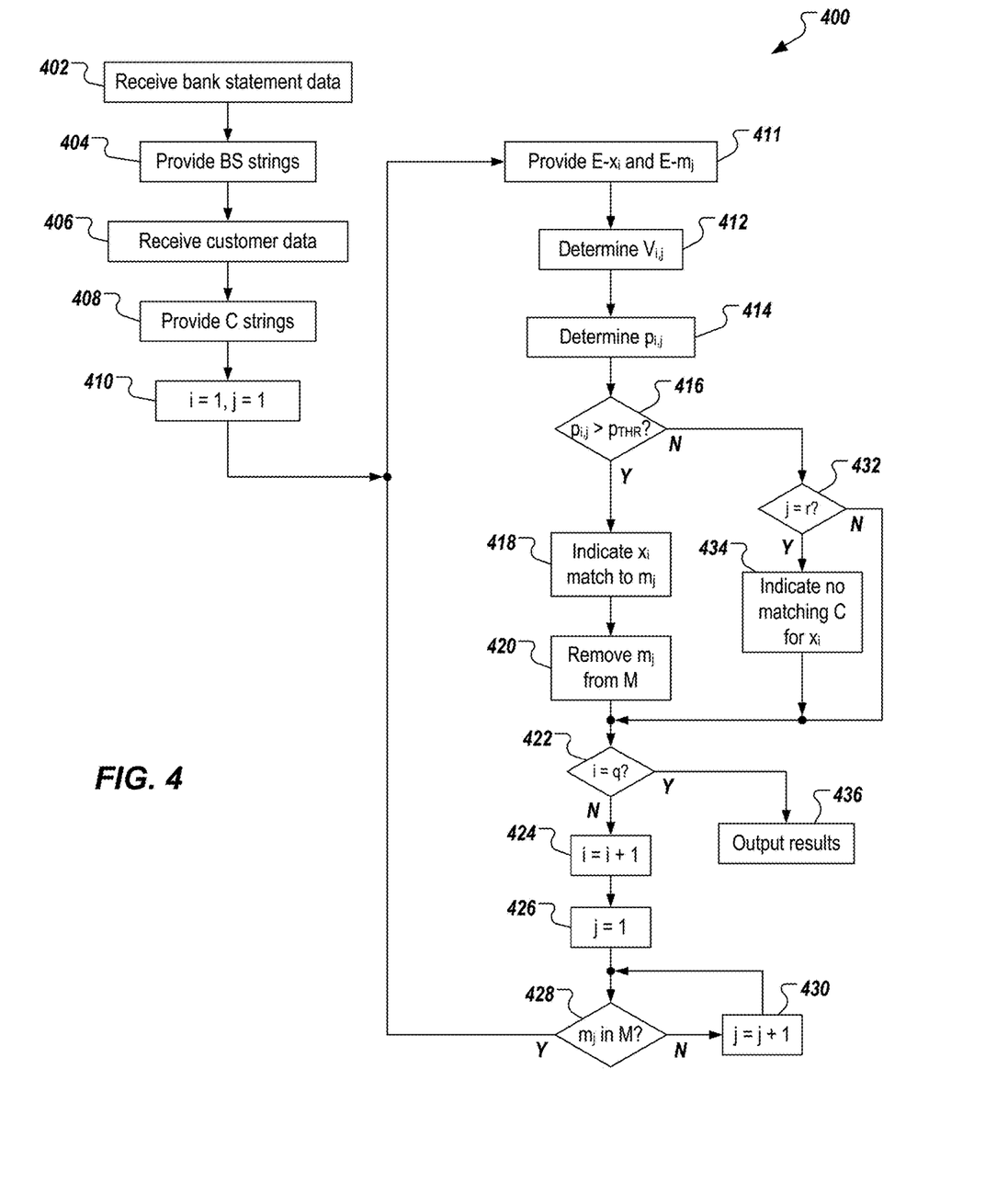
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. In some examples, the example process 400 is executed by an autonomous system that is tasked with, in the example use case, matching bank statements to customer accounts.

Bank statement data is received (402). For example, the autonomous system receives bank statement data representing bank statements that are to be matched to customer accounts. Bank statement strings are provided (404). For example, the autonomous system processes the bank statement data to provide a BS string for each bank statement, as described herein (e.g., the autonomous system including the string generator 302 of FIG. 3). Customer data is received (406). For example, the autonomous system receives customer data representing customer accounts that are to be matched to banks statements. Customer strings are provided (408). For example, the autonomous system processes the customer data to provide a C string for each customer, as described herein (e.g., the autonomous system including the string generator 302 of FIG. 3).

A counter i is set equal to 1 and a counter j is set equal to 1 (410). A BS-C pair is considered. More particularly, the BS-C pair is provided as $[x_i, m_j]$. An embedding for $x_i$ (E-$x_i$) and an embedding for $m_j$ (E-$m_j$) are provided (411). For example, and as described herein, a BS string for $x_i$ and a C string for $m_j$ are processed by the embedding layer of the neural network of the present disclosure (e.g., the embedding layer 306 of the neural network 304 of FIG. 3) to provide the embedding E-$x_i$ and the embedding for E-$m_j$.

A single vector ($V_{i,j}$) is determined (412). For example, and as described herein, the embedding E-$x_i$ and the embedding for E-$m_j$ are processed by a decomposable attention layer of the neural network of the present disclosure (e.g., the decomposable attention layer 308 of the neural network 304 of FIG. 3) to determine the single vector ($V_{i,j}$). A scalar confidence score ($p_{i,j}$) is determined (414). For example, and as described herein, the single vector ($V_{i,j}$) is processed by an activation layer of the neural network of the present disclosure (e.g., the activation layer 310 of the neural network 304 of FIG. 3) to determine the scalar confidence score ($p_{i,j}$).

It is determined whether the scalar confidence score ($p_{i,j}$) exceeds a threshold score ($p_{THR}$) (416). If the scalar confidence score ($p_{i,j}$) exceeds the threshold score ($p_{THR}$), an indication is provided that the bank statement $x_i$ matches the customer account $m_j$ (418). For example, a data set can be provided as $[x_i, m_j, l_{i,j}]$ where $l_{i,j}=1$. In some examples, the customer account $m_j$ is removed from M (420). For example, because the customer account $m_j$ has been matched to a bank statement (the bank statement $x_i$), the customer account $m_j$ need not be considered in subsequent iterations, if any.

It is determined whether i is equal to q (422). That is, it is determined whether all bank statements in X have been considered. If i is not equal to q, i is incremented (424) and j is set equal to 1 (426). It is determined whether $m_j$ is in M (428). If $m_j$ is in M, $m_j$ has not been previously matched to a bank statement, and the example process 400 loops back to evaluate the pair $[x_i, m_j]$. If $m_j$ is not in M, $m_j$ has been previously matched to a bank statement, and j is incremented (430).

In some examples, if the scalar confidence score ($p_{i,j}$) does not exceed the threshold score ($p_{THR}$), an indication is provided that the bank statement $x_i$ does not match the customer account $m_j$. For example, a data set can be provided as $[x_i, m_j, l_{i,j}]$, where $l_{i,j}=0$. It is determined whether j is equal to r (432). That is, it is determined whether all customer accounts in M have been considered for the bank statement $x_i$. If j is not equal to r, the example process 400 loops down. If j is equal to r, an indication can be provided that there is no customer account that matches the bank statement $x_i$ (434), and the example process 400 loops down. This can account for any instances, in which a bank statement is received from a customer that is not included in the customer database.

If i is equal to q, results are output (436). In some examples, the results include data sets that indicate one or more matches of bank statements to customers. In some examples, the results include data sets that indicate bank statements having no matching customers. Example data sets can be provided as:

[x1, m4, 1]
[x2, m1, 1]
[x3, m5, 1]
[x4, N]

where N indicates that no matching customer account was found.

Figure 5:
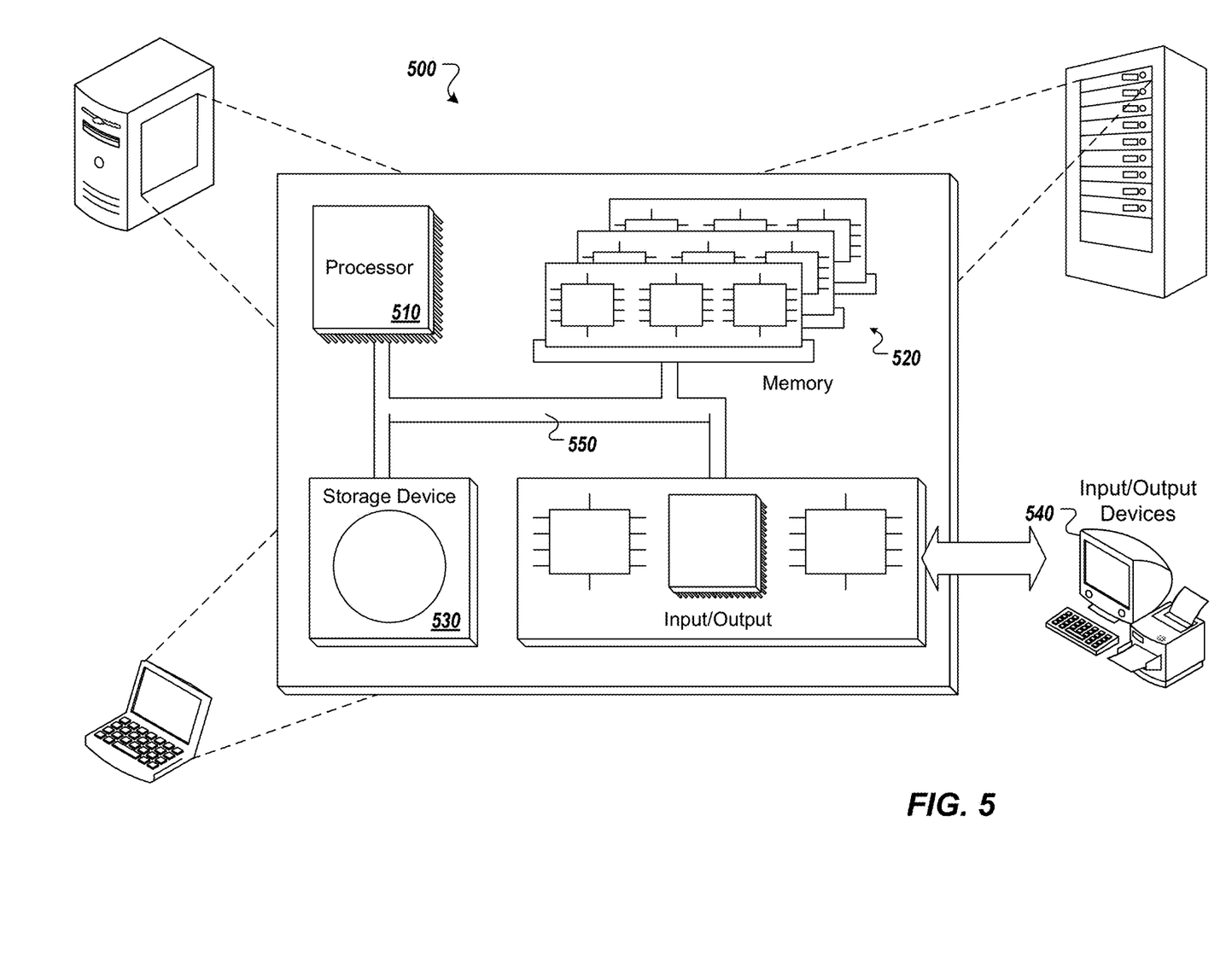
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for determining whether entities in a pair of entities match one another using a machine learning (ML) model, the method being executed by one or more processors and comprising:
    training a ML model using training data comprising a first set of entities and a second set of entities;
    defining an entity pair comprising a first entity and a second entity, the first entity being associated with first data representing the first entity and the second entity being associated with second data representing the second entity, the second entity being absent from the training data used to train the ML model using one-shot learning;
    providing a first entity string comprising at least a portion of the first data and a second entity string comprising at least a portion of the second data;
    processing the first entity string and the second entity string through a ML model to generate a scalar confidence score by:
        providing, by an embedding layer of the ML model, a first embedding based on the first entity string and a second embedding based on the second entity string,
        generating, by a decomposable attention layer of the ML model, a vector based on the first embedding and the second embedding, and
        generating, by an activation layer of the ML model, the scalar confidence score; and
    determining that the first entity matches the second entity based on the scalar confidence score.

2. The method of claim 1, wherein the second entity string comprises a concatenation of a first value of a first field and a second value of a second field of a table that stores the second data, each of the first value and the second value comprising a respective portion of the second data.

3. The method of claim 2, wherein the second entity string further comprises at least one padding character between the first value and the second value.

4. The method of claim 1, wherein the ML model is trained using a binary cross-entropy loss function.

5. The method of claim 1, wherein the activation layer comprises a sigmoid activation function.

6. The method of claim 1, further comprising generating a set of negative training data, wherein training of the ML model is performed at least partially based on the set of negative training data.

7. The method of claim 1, wherein the first entity comprises a bank statement and the second entity comprises a customer account.

8. A non-transitory computer-readable storage medium coupled to one or more processors and having instructions stored thereon which, when executed by the one or more processors, cause the one or more processors to perform operations for determining whether entities in a pair of entities match one another using a machine learning (ML) model, the operations comprising:
    training a ML model using training data comprising a first set of entities and a second set of entities;
    defining an entity pair comprising a first entity and a second entity, the first entity being associated with first data representing the first entity and the second entity being associated with second data representing the second entity, the second entity being absent from the training data used to train the ML model using one-shot learning;
    providing a first entity string comprising at least a portion of the first data and a second entity string comprising at least a portion of the second data;
    processing the first entity string and the second entity string through a ML model to generate a scalar confidence score by:
        providing, by an embedding layer of the ML model, a first embedding based on the first entity string and a second embedding based on the second entity string,
        generating, by a decomposable attention layer of the ML model, a vector based on the first embedding and the second embedding, and
        generating, by an activation layer of the ML model, the scalar confidence score; and
    determining that the first entity matches the second entity based on the scalar confidence score.

9. The computer-readable storage medium of claim 8, wherein the second entity string comprises a concatenation of a first value of a first field and a second value of a second field of a table that stores the second data, each of the first value and the second value comprising a respective portion of the second data.

10. The computer-readable storage medium of claim 9, wherein the second entity string further comprises at least one padding character between the first value and the second value.

11. The computer-readable storage medium of claim 8, wherein the ML model is trained using a binary cross-entropy loss function.

12. The computer-readable storage medium of claim 8, wherein the activation layer comprises a sigmoid activation function.

13. The computer-readable storage medium of claim 8, wherein operations further comprise generating a set of negative training data, wherein training of the ML model is performed at least partially based on the set of negative training data.

14. The computer-readable storage medium of claim 8, wherein the first entity comprises a bank statement and the second entity comprises a customer account.

15. A system, comprising:
    a computing device; and
    a computer-readable storage device coupled to the computing device and having instructions stored thereon which, when executed by the computing device, cause the computing device to perform operations for natural language explanations for determining whether entities in a pair of entities match one another using a machine learning (ML) model, the operations comprising:
        training a ML model using training data comprising a first set of entities and a second set of entities;
        defining an entity pair comprising a first entity and a second entity, the first entity being associated with first data representing the first entity and the second entity being associated with second data representing the second entity, the second entity being absent from the training data used to train the ML model using one-shot learning;
        providing a first entity string comprising at least a portion of the first data and a second entity string comprising at least a portion of the second data;
        processing the first entity string and the second entity string through a ML model to generate a scalar confidence score by:
            providing, by an embedding layer of the ML model, a first embedding based on the first entity string and a second embedding based on the second entity string,
            generating, by a decomposable attention layer of the ML model, a vector based on the first embedding and the second embedding, and
            generating, by an activation layer of the ML model, the scalar confidence score; and
        determining that the first entity matches the second entity based on the scalar confidence score.

16. The system of claim 15, wherein the second entity string comprises a concatenation of a first value of a first field and a second value of a second field of a table that stores the second data, each of the first value and the second value comprising a respective portion of the second data.

17. The system of claim 16, wherein the second entity string further comprises at least one padding character between the first value and the second value.

18. The system of claim 15, wherein the ML model is trained using a binary cross-entropy loss function.

19. The system of claim 15, wherein the activation layer comprises a sigmoid activation function.

20. The system of claim 15, wherein operations further comprise generating a set of negative training data, wherein training of the ML model is performed at least partially based on the set of negative training data.

* * * * *